US012103604B2

(12) United States Patent
Raither et al.

(10) Patent No.: US 12,103,604 B2
(45) Date of Patent: Oct. 1, 2024

(54) STEER-BY-WIRE STEERING GEAR HAVING A HOLLOW SHAFT MOTOR AND A BALL SCREW DRIVE

(71) Applicants: thyssenkrupp Presta AG, Eschen (LI); thyssenkrupp AG, Essen (DE)

(72) Inventors: Wolfram Raither, Sevelen (CH); Philippe Steck, Gamprin-Bendern (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 855 days.

(21) Appl. No.: 17/268,098

(22) PCT Filed: Aug. 20, 2019

(86) PCT No.: PCT/EP2019/072285
§ 371 (c)(1),
(2) Date: Feb. 12, 2021

(87) PCT Pub. No.: WO2020/038952
PCT Pub. Date: Feb. 27, 2020

(65) Prior Publication Data
US 2022/0111885 A1    Apr. 14, 2022

(30) Foreign Application Priority Data
Aug. 21, 2018   (DE) ............... 10 2018 120 266.0

(51) Int. Cl.
*B62D 5/04*     (2006.01)
*B62D 5/00*     (2006.01)
(Continued)

(52) U.S. Cl.
CPC ........... *B62D 5/006* (2013.01); *B62D 5/0427* (2013.01); *B62D 5/0445* (2013.01);
(Continued)

(58) Field of Classification Search
CPC ......... F16H 2025/2078; B62D 5/0427; B62D 5/0445; B62D 5/0454
See application file for complete search history.

(56) References Cited

U.S. PATENT DOCUMENTS 3,508,633 A    4/1970  Yoshihiro
3,699,624 A   10/1972  De Gain
(Continued)

FOREIGN PATENT DOCUMENTS

CN        2278793 Y     4/1998
CN     101332830 A    12/2008
(Continued)

OTHER PUBLICATIONS

English Translation of International Search Report issued in PCT/EP2019/072285, dated Dec. 18, 2019.
(Continued)

*Primary Examiner* — Tony H Winner
*Assistant Examiner* — Hosam Shabara
(74) *Attorney, Agent, or Firm* — thyssenkrupp North America, LLC

(57) ABSTRACT

A steering gear for a steer-by-wire steering system of a motor vehicle may include a hollow shaft motor with a stator that is fixed to a housing and a rotatably supported rotor that is arranged coaxially with respect to a longitudinal axis. A worm gear may extend through the rotatably supported rotor. The worm gear comprises a spindle nut that is arranged coaxially relative to the longitudinal axis, that is connected in terms of driving to the rotor, and that is located on a spindle that is displaceable by way of the hollow shaft motor along the longitudinal axis. The angle of inclination of the worm gear may be less than 4.5°.

10 Claims, 2 Drawing Sheets

(51) Int. Cl.
*B62D 6/00* (2006.01)
*F16H 25/20* (2006.01)
*F16H 25/22* (2006.01)

(52) U.S. Cl.
CPC ............ *B62D 5/0454* (2013.01); *B62D 5/046* (2013.01); *B62D 6/008* (2013.01); *F16H 25/2204* (2013.01); *F16H 2025/2078* (2013.01)

(56) References Cited

U.S. PATENT DOCUMENTS

| | | | |
|---|---|---|---|
| 4,050,326 | A | 9/1977 | Kopf |
| 4,653,602 | A | 3/1987 | Anders et al. |
| 4,742,882 | A | 5/1988 | Shimizu et al. |
| 5,461,767 | A | 10/1995 | Okubo |
| 5,503,431 | A | 4/1996 | Yamamoto |
| 5,595,089 | A | 1/1997 | Watanabe et al. |
| 5,975,234 | A * | 11/1999 | Bugosh ................ H02K 11/33 180/444 |
| 2002/0198057 | A1 | 12/2002 | Stervik |
| 2003/0047374 | A1 | 3/2003 | Peppler et al. |
| 2003/0051938 | A1 | 3/2003 | Menjak et al. |
| 2007/0089926 | A1 | 4/2007 | Jo et al. |
| 2008/0011537 | A1 | 1/2008 | Ozsoylu |
| 2009/0001701 | A1 | 1/2009 | Watanabe et al. |
| 2011/0247891 | A1 | 10/2011 | Meyer |
| 2012/0024616 | A1* | 2/2012 | Birkwald ............ B62D 5/0427 180/444 |
| 2017/0248247 | A1 | 8/2017 | Lenz |
| 2018/0319422 | A1 | 11/2018 | Polmans et al. |
| 2019/0061812 | A1 | 2/2019 | Hecker et al. |
| 2019/0152521 | A1 | 5/2019 | Urbach |
| 2019/0315391 | A1* | 10/2019 | Illés ................... B62D 5/0403 |

FOREIGN PATENT DOCUMENTS

| | | | | |
|---|---|---|---|---|
| CN | 207345912 U | 5/2018 | | |
| CN | 207565676 U | 7/2018 | | |
| DE | 800480 C | 11/1950 | | |
| DE | 2459246 A | 6/1976 | | |
| DE | 10114308 A | 8/2001 | | |
| DE | 10157797 A1 | 9/2002 | | |
| DE | 10200097 A1 | 7/2003 | | |
| DE | 10331597 A1 | 2/2005 | | |
| DE | 102005051981 A | 11/2006 | | |
| DE | 102005051981 A1 * | 11/2006 | ........... | B62D 5/0427 |
| DE | 102006008911 A | 8/2007 | | |
| DE | 102006008911 A1 * | 8/2007 | ........... | B62D 5/0427 |
| DE | 102009024847 A | 12/2010 | | |
| DE | 10 2012 015 181 A | 5/2014 | | |
| DE | 102012015181 A1 | 5/2014 | | |
| DE | 10 2013 000 892 A1 | 7/2014 | | |
| DE | 102015118292 A1 | 4/2017 | | |
| DE | 10 2015 015 148 A1 | 6/2017 | | |
| DE | 102016212812 A1 | 1/2018 | | |
| EP | 0661117 A | 7/1995 | | |
| EP | 1911660 A | 4/2008 | | |
| GB | 1262913 A | 2/1972 | | |
| JP | S62-137269 A | 6/1987 | | |
| JP | H05270415 A | 10/1993 | | |
| JP | 2003118597 A | 4/2003 | | |
| WO | WO-03016122 A1 * | 2/2003 | ........... | B62D 5/0427 |
| WO | 2011047921 A1 | 4/2011 | | |
| WO | 2014019694 A1 | 2/2014 | | |
| WO | 2017184815 A1 | 10/2017 | | |

OTHER PUBLICATIONS

"Merkmale der Kugelgewindetriebe" THK. Retrieved from the Internet: https://tech.thk.com/de/products/pdf/de_b15_006.pdf [retrieved on Dec. 18, 2019] XP002796566. [English translation not available].

* cited by examiner

STEER-BY-WIRE STEERING GEAR HAVING A HOLLOW SHAFT MOTOR AND A BALL SCREW DRIVE

CROSS REFERENCE TO RELATED APPLICATIONS

This application is a U.S. National Stage Entry of International Patent Application Serial Number PCT/EP2019/072285, filed Aug. 20, 2019, which claims priority to German Patent Application No. DE 10 2018 120 266.0, filed Aug. 21, 2018, the entire contents of both of which are incorporated herein by reference.

FIELD

The present disclosure generally relates to steer-by-wire steering systems of motor vehicles and to steering gears for steer-by-wire steering systems.

BACKGROUND

In steer-by-wire steering systems, the position of the steered wheels is not directly coupled to the steering input means, for example, a steering wheel. There is a connection between the steering wheel and the steered wheels via electrical signals. The steering action desired by the driver is detected by a steering angle sensor and, depending on the steering action desired by the driver, the position of the steered wheels is controlled via a steering actuator.

DE 10 2006 008 911 A1 discloses a steering system for a motor vehicle having a hollow shaft motor through whose hollow shaft there is guided a rod which can be driven in a longitudinal direction by means of the electric motor and which, when used in a power-assisted steering system, is constructed in a region as a toothed rod for engagement with a steering pinion. The hollow shaft is in this instance connected to a pulley in a rotationally secure manner. The pulley forms an intermediate transmission with respect to a roller member worm gear. This solution has been found to be disadvantageous since many components are required to ensure safety functions of a steer-by-wire steering system.

Thus a need exists for a steering gear for a steer-by-wire steering system of a motor vehicle which has a small structural space requirement, comprises fewer components and at the same time provides more functional reliability.

DETAILED DESCRIPTION

Figure 1:
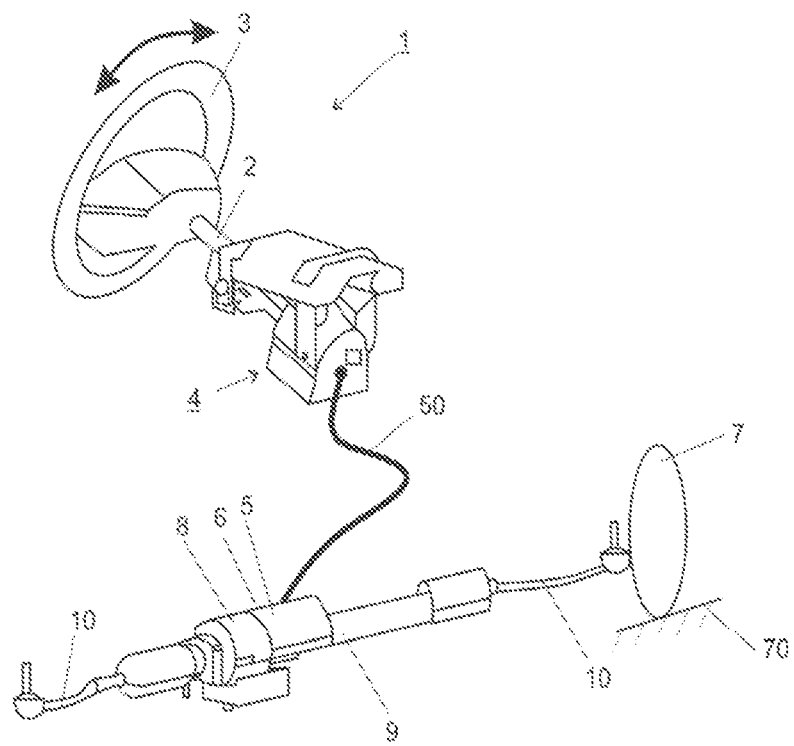
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steering gear for a steer-by-wire steering system of a motor vehicle having a hollow shaft motor with a stator which is fixed to a housing and a rotatably supported rotor which is arranged coaxially with respect to a longitudinal axis and through which a worm gear extends is provided, wherein the worm gear comprises a spindle nut which is arranged coaxially relative to the longitudinal axis and which is connected in terms of driving to the rotor and which is located on a spindle which can be displaced by means of the hollow shaft motor along the longitudinal axis, and wherein the angle of inclination of the worm gear is less than 4.5°, in particular less than 4° and in a particularly preferred manner less than 3.5°.

In an advantageous embodiment, there is produced, particularly in ball screw drives, a degree of efficiency $$\eta = \frac{\tan(\alpha)}{\tan(\alpha + \varphi)}$$

with a conversion of a torque into an axial force, wherein $\varphi$ is the friction angle and $\alpha$ is the angle of inclination. Below a defined value, the ball screw drive is self-locking, that is to say, in approximate terms the angle of inclination $\alpha$<friction angle $\varphi$. The friction angle is preferably less than 4.4° and greater than 0.1°. The large translation ratio enables a compact configuration of the hollow shaft motor. Since no belt drive is required, components can be saved and the operational reliability can be increased.

In an advantageous embodiment, the worm gear is a roller member worm gear, in particular a ball screw drive or a roller screw drive. In another advantageous embodiment, the worm gear is a trapezoidal screw drive.

There may be provision for the rotor to be located directly on the nut and to be connected thereto in a rotationally secure manner. In this instance, it is advantageous for the rotor to surround the nut in a coaxial manner. However, an intermediate gear transmission which reduces the speed of the hollow shaft motor and which connects the rotor to the nut may also be provided.

There is further provided a steer-by-wire steering system for a motor vehicle, comprising:
- a steering gear which acts on the steered wheels,
- a control unit,
- a feedback actuator which can be acted on by a driver with a driver's desired steering angle via a steering input means and which transmits a feedback signal to the steering input means as a response to the driver's request and a travel state of the motor vehicle,
- a device for signal transmission, which transmits the driver's request to the control unit,
- wherein the control unit controls the steering gear in order to transform the driver's request into a redirection of the steered wheels, and wherein the steering gear is configured as described above.

Preferably, the spindle is itself constructed as a steering rod which, in order to steer the wheels of the motor vehicle, is connected to tie rods.

FIG. 1 shows a steer-by-wire steering system 1. There is fitted to a steering shaft 2 a rotary angle sensor which is not illustrated and which detects a driver steering angle which is applied by turning a steering input means 3 which is constructed in the example as a steering wheel. However, a steering torque can also be detected in addition. A joy-stick may be used as the steering input means. There is further fitted to the steering shaft 2 a feedback actuator 4 which serves to simulate the reactions from the road 70 to the steering wheel 3 and consequently to provide the driver with feedback relating to the steering and travel behavior of the vehicle. The driver's steering request is transmitted via the rotation angle of the steering shaft 2 measured by the rotary angle sensor to a feedback actuator monitor unit which is not illustrated. The feedback actuator monitor unit transmits the driver's steering request to a control unit 5. The feedback actuator monitor unit preferably also takes over the control of the feedback actuator 4. The feedback actuator monitor unit may also be constructed integrally with the control unit 5. The control unit 5 controls in accordance with the signal of the rotary angle sensor and other input variables an electrical steering actuator 6 which controls the position of the steered wheels 7. The steering actuator 6 is part of a steering gear 8 having a steering rod 9. It acts via tie rods 10 and other components indirectly on the steered wheels 7.

Figure 2:
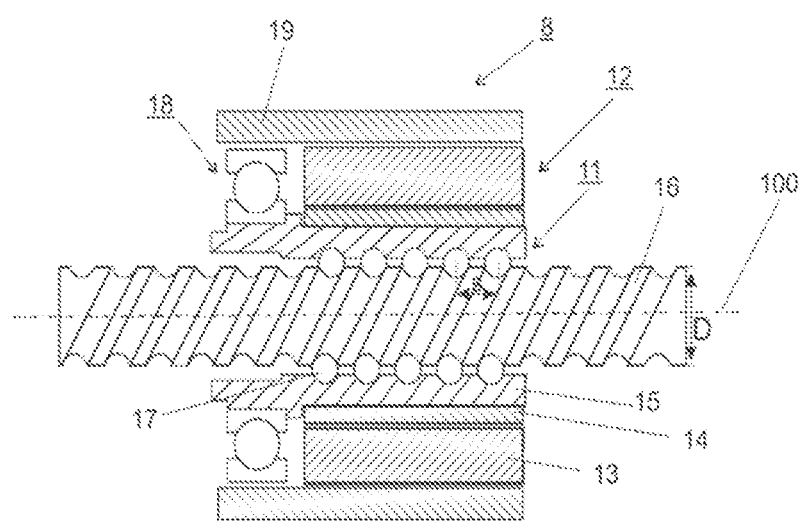
FIG. 2 is a longitudinal sectional view through an example steering gear with a hollow shaft motor and a ball screw drive.

FIG. 2 is a longitudinal section through a steering gear 8 according to the invention having a ball screw drive 11 and hollow shaft motor 12 along the longitudinal axis 100 thereof. The hollow shaft motor 12 is preferably permanently excited and has a hollow-cylindrical shape. It comprises a stator 13 and a rotor 14, which is inlaid in the stator 13. The stator 13 and rotor 14 are located coaxially relative to the longitudinal axis 100. The rotor 14 is rotatably supported about the longitudinal axis 100 and has a hollow cylindrical form. The rotor 14 is located on a ball nut 15 and is connected thereto in a rotationally secure manner. There may also be provision for the rotor 14 to be in positive-locking contact with the ball nut 15 via an intermediate transmission and to drive it via the intermediate transmission. In other words, there may be provided an intermediate transmission which connects the rotor 14 to the ball nut 15 in the force path. The intermediate transmission is preferably a planetary gear or a harmonic drive. The ball nut 15 is arranged coaxially relative to the longitudinal axis 100 and is passed through by a ball screw spindle 16 coaxially relative to the longitudinal axis. A torque is transmitted from the ball nut 15 via balls 17 to the ball screw spindle 16. The ball nut 15 is rotatably supported by means of a ball bearing 18 in a housing 19. A rotational movement of the hollow shaft motor 12 is converted into a translational movement of the ball screw spindle 16 along the longitudinal axis 100.

The ball screw drive 11 has a large translation ratio (small angle of inclination α). This enables electric motors with a smaller torque to be used. The torque of an electric motor is substantially proportional to the diameter thereof. Structural space and costs can consequently be saved. Preferably, the angle of inclination α of the ball screw drive is less than 4°. In other words, the ratio of the thread pitch s with respect to the ball reference diameter of the ball screw spindle D is less than 0.22 since the following relationship applies:

$$\tan(\alpha) = \frac{s}{D * \pi}.$$

In steer-by-wire steering systems without a mechanical fallback level, such a large transmission ratio is unproblematic since high sliding forces or self-locking are permitted. The use of a pulley can be dispensed with, whereby components can be saved and significant advantages are afforded with regard to operational reliability and which are of significant importance for steer-by-wire steering systems. In particular, as a result of the omission of a toothed belt, which under the safety requirements of a steer-by-wire steering system has to be considered to be a critical component, in this instance additional safety measures, such as redundant components, can be saved.

When a torque is converted into an axial force in ball screw drives, the degree of efficiency $$\eta = \frac{\tan(\alpha)}{\tan(\alpha + \varphi)}$$

is produced, wherein φ is the friction angle.

Figure 3:
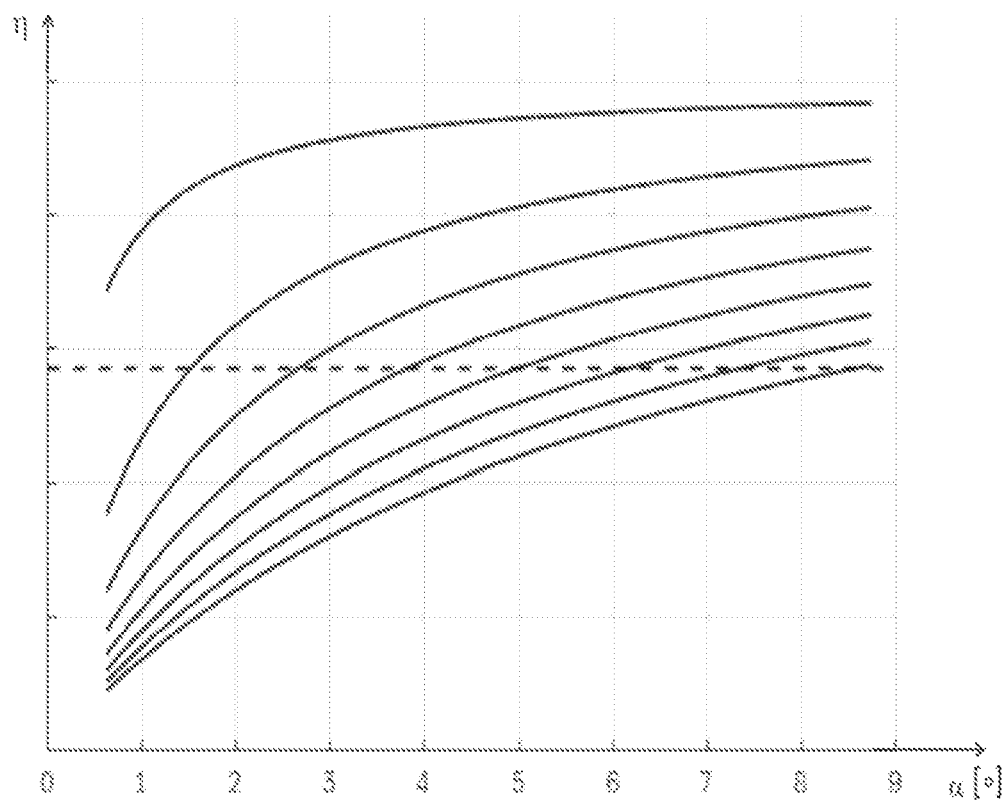
FIG. 3 is a graph showing the progressions of a dependency between a degree of efficiency and an angle of inclination for different ball screw drives.

FIG. 3 shows the degree of efficiency η in accordance with the angle of inclination α for eight different friction angles φ. The friction angle in the form of tan(φ) decreases along the Y axis in an upward direction. Below the dashed line, the ball screw drive is self-locking, that is to say, there is approximately an angle of inclination α<friction angle φ. The friction angle is preferably less than 4.4° and greater than 0.1°. The ball screw drive used in FIG. 2 preferably has an angle of inclination less than 4.5°, in particular less than 4°. In conventional electromechanical steering gears having a hollow shaft motor, such a ball screw drive may not be used since it would not comply with the great requirements for the sliding force and the prevention of self-locking (requirements for turning ability in the event of a system failure).

What is claimed is:

1. A steer-by-wire steering system for a motor vehicle, the steer-by-wire steering system comprising:
   a steering gear comprising:
      a hollow shaft motor that includes
         a stator that is fixed to a housing, and
         a rotatably supported rotor that is arranged coaxially with respect to a longitudinal axis; and
      a worm gear extending through the rotatably supported rotor, wherein the worm gear comprises a spindle nut that is disposed coaxially relative to the longitudinal axis, that is connected in terms of driving to the rotatably supported rotor, and that is located on a spindle that is displaceable by way of the hollow shaft motor along the longitudinal axis, wherein an angle of inclination of the worm gear is less than 4.5°, the steering gear configured to act on steered wheels;
   a control unit;
   a feedback actuator configured to be acted upon by a driver according to a driver-desired steering angle via steering input means, wherein the feedback actuator is configured to transmit a feedback signal to the steering input means in response to the driver-desired steering angle and a travel state of the motor vehicle; and
   a signal transmission device configured to transmit the driver-desired steering angle to the control unit,
   wherein the control unit is configured to control the steering gear to transform the driver-desired steering angle into a redirection of the steered wheels.

2. The steer-by-wire steering system of claim 1 wherein the spindle is configured as a steering rod that is connected to tie rods to steer the steered wheels.

3. The steer-by-wire steering system of claim 1 wherein the angle of inclination of the worm gear is less than 4°.

4. The steer-by-wire steering system of claim 1 wherein the angle of inclination of the worm gear is less than 3.5°.

5. The steer-by-wire steering system of claim 1 wherein the worm gear is a roller member worm gear.

6. The steer-by-wire steering system of claim 1 wherein the worm gear is a ball screw drive.

7. The steer-by-wire steering system of claim 1 wherein the worm gear is a trapezoidal screw drive.

8. The steer-by-wire steering system of claim 1 wherein the worm gear is a roller screw drive.

9. The steer-by-wire steering system of claim 1 wherein the rotor is disposed directly on the spindle nut and is connected thereto in a rotationally secure manner.

10. The steer-by-wire steering system of claim 1 comprising an intermediate gear transmission that reduces a speed of the hollow shaft motor and that connects the rotor to the spindle nut.

\* \* \* \* \*